(12) United States Patent
Ehrsam et al.

(10) Patent No.: US 9,638,173 B2
(45) Date of Patent: May 2, 2017

(54) SOLAR THERMAL POWER SYSTEM

(71) Applicant: ALSTOM Technology Ltd, Baden (CH)

(72) Inventors: Andreas Ehrsam, Rieden (CH); Maurus Herzog, Schinznach Dorf (CH); Suman Ray, Wettingen (CH)

(73) Assignee: ALSTOM Technology Ltd., Baden (CH)

( * ) Notice: Subject to any disclaimer, the term of this patent is extended or adjusted under 35 U.S.C. 154(b) by 535 days.

(21) Appl. No.: 13/855,297

(22) Filed: Apr. 2, 2013

(65) Prior Publication Data

US 2013/0255254 A1 Oct. 3, 2013

(30) Foreign Application Priority Data

Apr. 2, 2012 (EP) .................................. 12162906

(51) Int. Cl.
*F03G 6/00* (2006.01)
*F03G 6/06* (2006.01)

(52) U.S. Cl.
CPC ............ *F03G 6/003* (2013.01); *F03G 6/065* (2013.01); *Y02E 10/46* (2013.01)

(58) Field of Classification Search
CPC ... F01K 25/10; F03G 6/00; F03G 7/04; F03G 6/003; F03G 6/065; F24J 2/07;
(Continued)

(56) References Cited

U.S. PATENT DOCUMENTS 4,164,123 A 8/1979 Smith
8,544,273 B2 10/2013 Brenmiller et al.
(Continued)

FOREIGN PATENT DOCUMENTS

CN 101413719 A 4/2009
CN 101876299 A 11/2010
(Continued)

OTHER PUBLICATIONS

Office Action (First Office Action) issued on Jan. 30, 2015, by the State Intellectual Property Office of the People's Republic of China in corresponding Chinese Patent Application No. 201310112008.2, and an English Language Translation. (17 pages).
(Continued)

*Primary Examiner* — Thai Ba Trieu
*Assistant Examiner* — Mickey France
(74) *Attorney, Agent, or Firm* — Dority & Manning, P.A.

(57) ABSTRACT

A solar thermal power system can include a solar receiver steam generator, a thermal energy storage arrangement utilizing a thermal energy storage fluid, and a multistage steam turbine for driving an electrical generator to produce electrical power. The solar thermal power system has a first operating mode in which steam is generated by the solar receiver steam generator and is supplied both to the thermal energy storage arrangement and to a high pressure turbine inlet of the multistage steam turbine. In a second operating mode, steam is generated by recovering stored thermal energy from the thermal energy storage fluid of the thermal energy storage arrangement for injection into the multistage steam turbine at a location or turbine stage downstream of the high pressure turbine inlet.

15 Claims, 4 Drawing Sheets

(58) Field of Classification Search
CPC ......... Y02E 10/10; Y02E 10/34; Y02E 10/41; Y02E 10/44; Y02E 10/46
USPC ... 60/616, 618, 641.1, 641.8, 645, 677, 678, 60/681; 126/569–713; 165/104.19–104.32
See application file for complete search history.

(56) References Cited

U.S. PATENT DOCUMENTS

| | | |
|---|---|---|
| 2011/0277469 A1 | 11/2011 | Brenmiller et al. |
| 2012/0255300 A1 | 10/2012 | Birnbaum et al. |
| 2013/0056170 A1 | 3/2013 | Klemencic |

FOREIGN PATENT DOCUMENTS

| | | | |
|---|---|---|---|
| CN | 102216613 A | 10/2011 | |
| JP | 2004-340093 A | 12/2004 | |
| WO | 2011/080021 A2 | 7/2011 | |
| WO | 2011/119413 A2 | 9/2011 | |
| WO | WO 2011119413 A2 * | 9/2011 | ............. F03G 6/067 |

OTHER PUBLICATIONS

Extended European Search Report issued on Aug. 28, 2012, by the European Patent Office in corresponding European Patent Application No. 12162906.7 (8 pages).

\* cited by examiner

SOLAR THERMAL POWER SYSTEM

RELATED APPLICATION

This application claims priority under 35 U.S.C. §119 to European Patent Application No. 12162906.7 filed in Europe on Apr. 2, 2012, the entire content of which is hereby incorporated by reference in its entirety.

TECHNICAL FIELD

The present disclosure relates generally to the field of concentrated solar power (CSP). Embodiments of the present disclosure relate to a solar thermal power system that utilises concentrated solar power to generate electricity and/or to an operating method for a solar thermal power system.

BACKGROUND

Concentrated solar power (CSP) involves the use of lenses, mirrors or other optical devices to focus solar radiation from a large incident area onto a small area. The energy from the solar radiation is then used to generate electrical power. Concentrated solar power has the potential to become an important energy source in the future.

There have been many proposals for concentrated solar power technology. The technology believed to have the most potential for providing high efficiency power generation is the concentrated solar thermal power system. This technology involves the use of a solar receiver steam generator, mounted atop a tower, onto which solar radiation is reflected by an array of tracking reflectors, such as heliostats forming a heliostat field around the tower. The reflected solar radiation directly heats water circulating through the solar receiver steam generator. This generates superheated steam which is used to drive a steam turbine generator set, and thereby generate electrical power, the Rankine cycle.

Concentrated solar thermal power systems can include energy storage capability so that they can continue to generate electrical power when the solar radiation reflected onto the solar receiver steam generator is not sufficient to generate steam at the desired pressure and temperature to drive the steam turbine generator set. The energy storage capability can be provided by a thermal energy storage arrangement which uses a high specific heat capacity thermal energy storage fluid, such as molten salt or a mixture of different molten salts. Thermal energy is stored during a charging cycle by heating the molten salt and the thermal energy is subsequently recovered during a discharging cycle to heat water, and thereby generate steam for the steam turbine generator set.

During a first operating mode of the solar thermal power system, a proportion of superheated steam generated by the solar receiver steam generator is supplied directly to the high pressure turbine inlet of the steam turbine generator set for electrical power generation. The remaining superheated steam is supplied to the thermal energy storage arrangement to support the charging cycle in which a heat exchanger is used to extract thermal energy from the superheated steam and transfer it to the molten salt. The heated molten salt is stored in an insulated storage container. During a second operating mode of the solar thermal power system when superheated steam is not supplied by the solar receiver steam generator to the steam turbine generator set or to the thermal energy storage arrangement, previously stored thermal energy is recovered from the hot molten salt during a discharging cycle by a heat exchanger and the recovered thermal energy is used to heat water, and thereby generate superheated steam. This superheated steam is supplied to the steam turbine generator set, again via the high pressure turbine inlet, to generate electrical power.

In order for solar thermal power systems of this type to operate at maximum efficiency and maximum power output, the steam generated by the thermal energy storage arrangement during the second operating mode should ideally have the same temperature and pressure as the steam generated by the solar receiver steam generator during the first operating mode. However, because of the manner in which the molten salt is heated during the first operating mode by extracting thermal energy from the superheated steam in a heat exchanger, the maximum temperature that can be attained by the molten salt is lower than the maximum temperature of the steam from which the thermal energy is extracted. This results in energy loss (also known as a 'pinch point loss') and occurs because as the superheated steam cools in the heat exchanger during the charging cycle, it changes state to condensed water. During this change of state when latent heat is released, the temperature of the steam does not decrease but the temperature of the molten salt increases monotonically. Due to this mismatch of thermal behaviour between the two fluids in the heat exchanger, the highest temperature that the molten salt can attain is lower than the temperature of the incoming superheated steam, leading to reduced energy.

Consequently, when thermal energy is subsequently recovered from the molten salt during the second operating mode of the solar thermal power system to generate steam for the steam turbine generator set, the generated steam attains a lower pressure (possibly greater than 20% lower) and a lower temperature (possibly greater than 30° C. to 100° C. or more lower depending on the thermal energy storage arrangement that is used) than the superheated steam that was used to heat the molten salt and drive the steam turbine generator set during the first operating mode. Because steam at sub-optimal pressure and temperature is supplied to the steam turbine generator set via the high pressure turbine inlet during the second operating mode, the steam turbine generator set operates in a part-load condition which reduces power output of the solar thermal power system. It is not uncommon for the power output to be more than 20% lower during the second operating mode than during the first operating mode (when a proportion of the superheated steam from the solar receiver steam generator is supplied directly to the high pressure turbine inlet of the steam turbine generator set).

It would, therefore, be desirable to provide a solar thermal power system having improved operational efficiency and power output, for example, during a second operating mode when steam is generated by recovering stored thermal energy from a thermal energy storage fluid of a thermal energy storage arrangement.

SUMMARY

A solar thermal power system is disclosed comprising: a solar receiver steam generator; a thermal energy storage arrangement including a thermal energy storage fluid; a multistage steam turbine for driving an electrical generator to produce electrical power; and a flow control having: a first operating mode in which steam generated by the solar receiver steam generator will be supplied to the thermal energy storage arrangement to heat the thermal energy storage fluid and to a high pressure turbine inlet of the multistage steam turbine to drive the steam turbine; and a second operating mode in which steam, generated by recovering stored thermal energy from the thermal energy storage fluid and having a storage discharge pressure and storage discharge temperature lower than the pressure and temperature of the steam generated during the first operating mode, will be injected into the multistage steam turbine to drive the steam turbine at a turbine stage downstream of the high pressure turbine inlet where the storage discharge pressure exceeds the pressure present in the turbine stage during the first operational mode, to thereby increase mass flow through the turbine relative to mass flow during the first operational mode.

A method for operating a solar thermal power system is also disclosed having a solar receiver steam generator, a thermal energy storage arrangement with a thermal energy storage fluid, and a multistage steam turbine for driving an electrical generator to produce electrical power, the method comprising: a first operating mode for generating steam by the solar receiver steam generator; a second operating mode for generating steam by recovering stored thermal energy from the thermal energy storage fluid, storage steam generated during the second operating mode having a lower pressure and lower temperature than the steam generated during the first operating mode; supplying the steam generated during the first operating mode to the thermal energy storage arrangement to heat the thermal energy storage fluid, and to a high pressure turbine inlet of the multistage steam turbine to drive the steam turbine; and injecting the storage steam generated during the second operating mode into the multistage steam turbine at a turbine stage downstream of the high pressure turbine inlet where the storage discharge steam pressure exceeds the pressure present in the turbine stage during the first operational mode to thereby increase mass flow through the turbine relative to mass flow during the first operational mode.

BRIEF DESCRIPTION

Embodiments of the present disclosure will now be described by way of example only and with reference to the accompanying drawings, wherein.

DETAILED DESCRIPTION

Figure 1:
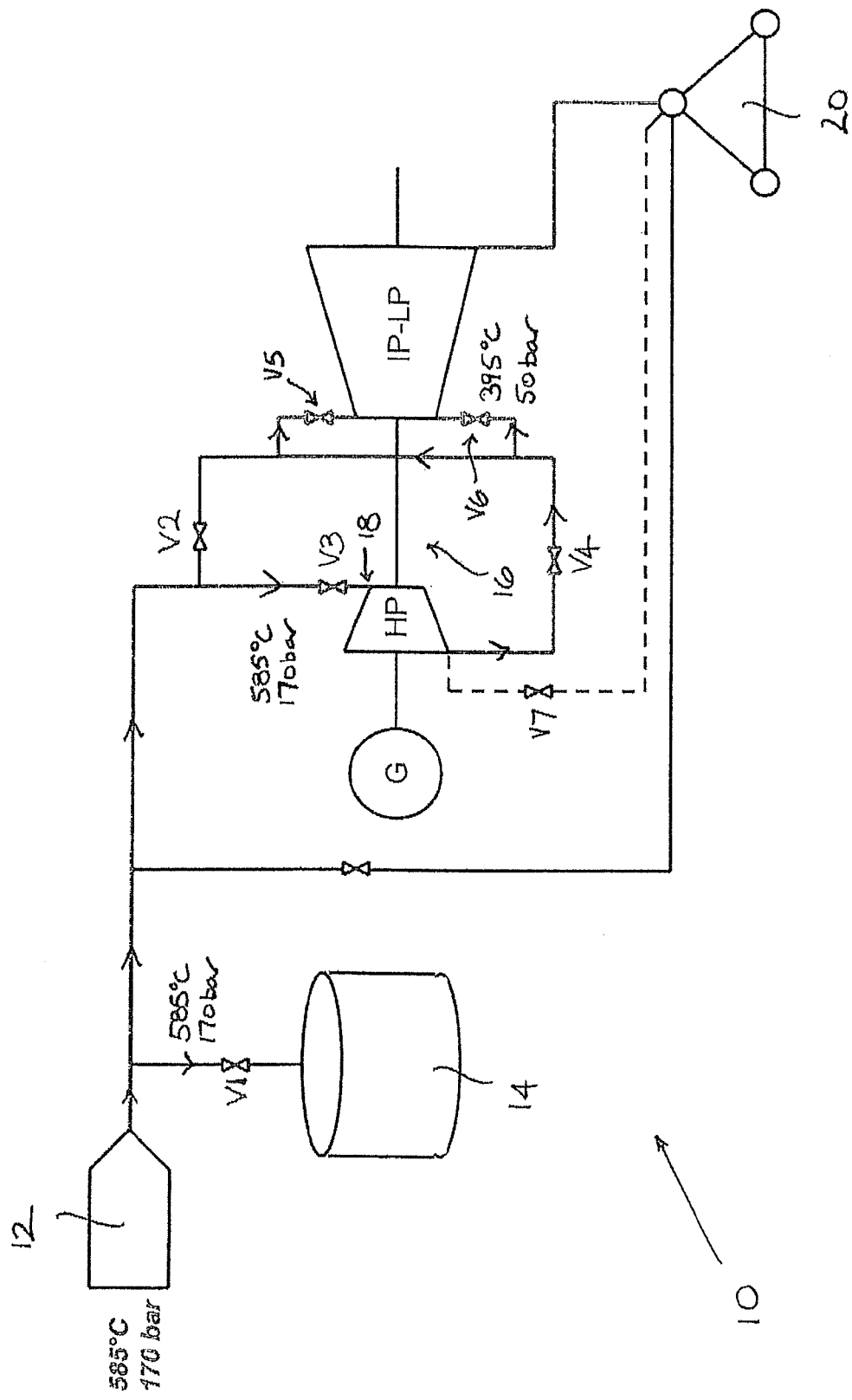
FIGS. 1 and 2 are diagrammatic illustrations of an exemplary embodiment of a solar thermal power system in first and second operating modes respectively.

According to a first aspect of the present disclosure, there is provided a solar thermal power system comprising a solar receiver steam generator, a thermal energy storage arrangement including a thermal energy storage fluid, and a multistage steam turbine for driving an electrical generator to produce electrical power, wherein the solar thermal power system has:
- a first operating mode in which steam is generated by the solar receiver steam generator and is supplied to the thermal energy storage arrangement to heat the thermal energy storage fluid and to a high pressure turbine inlet of the multistage steam turbine to drive the steam turbine; and
- a second operating mode in which steam is generated by recovering stored thermal energy from the thermal energy storage fluid, the steam generated during the second operating mode having a storage discharge pressure and storage discharge temperature lower than the pressure and temperature of the steam generated during the first operating mode, wherein the steam at storage discharge pressure and lower temperature is injected into the multistage steam turbine at a location or turbine stage downstream of the high pressure turbine inlet where the storage discharge pressure exceeds the pressure present in the turbine stage during the first operational mode and hence increases the mass flow through the turbine compared to the mass flow during the first operational mode.

According to a second aspect of the present disclosure, there is provided a method for operating a solar thermal power system, the system comprising a solar receiver steam generator, a thermal energy storage arrangement including a thermal energy storage fluid, and a multistage steam turbine for driving an electrical generator to produce electrical power, wherein the solar thermal power system has:
- a first operating mode in which steam is generated by the solar receiver steam generator; and
- a second operating mode in which steam is generated by recovering stored thermal energy from the thermal energy storage fluid, the storage steam generated during the second operating mode having a storage discharge pressure and temperature lower than the pressure and temperature of the steam generated during the first operating mode;
- wherein the operating method comprises supplying the steam generated during the first operating mode to the thermal energy storage arrangement to heat the thermal energy storage fluid and to a high pressure turbine inlet of the multistage steam turbine to drive the steam turbine;
- wherein the operating method comprises injecting steam at the storage discharge pressure and temperature generated during the second operating mode into the multistage steam turbine at a location or turbine stage downstream of the high pressure turbine inlet where the storage discharge pressure exceeds the pressure present in the turbine stage during the first operational mode and hence increases the mass flow through the turbine compared to the mass flow during the first operational mode.

By injecting the lower pressure and lower temperature steam generated during the second operating mode into the multistage steam turbine at a location which bypasses the high pressure turbine inlet and which is compatible with the sub-optimal (e.g., lower pressure and lower temperature) steam conditions, the power output of the multistage steam turbine can be considerably increased. In some circumstances, the power output during the second operating mode of the solar thermal power system may be similar to the power output during the first operating mode when steam from the solar receiver steam generator is supplied directly to the high pressure turbine inlet.

The power output of the steam turbine is, in the exemplary embodiment, dependent upon the mass flow rate of steam through the turbine, so in order to increase power output it is necessary to increase the steam mass flow rate. Since modern steam turbines have a fixed swallowing capacity and therefore operate with a constant volume flow rate of steam, it is desirable to vary the steam pressure and temperature to vary the mass flow rate. According to the exemplary embodiments of present disclosure, the lower pressure and lower temperature steam injected at the downstream location during the second operating mode has a higher pressure than steam at the corresponding location or stage during the first operating mode that has been supplied to the high pressure turbine inlet and expanded through the turbine to that location, such expansion serving to reduce the steam pressure and thereby extracting work. The mass flow rate of steam through the steam turbine at the downstream location is thus greater during the second operating mode than during the first operating mode, and this increases the power output of the turbine stage(s) downstream of the injection location and, hence, the power output of the steam turbine during the second operating mode.

Bypassing the high pressure turbine inlet during the second operating mode also can minimise thermal stresses at the high pressure turbine inlet because it is not subjected to different steam temperatures during the first and second operating modes. Cyclic operation, between the first and second operating modes, occurs frequently, for example during daily start-up and overcast conditions when there are load fluctuations.

In the field of steam turbines a stage can be referred to as the location of a adjacent pair of guide vanes and rotating blades or airfoils. All stages together form the steam path through the turbine. At a given feed pressure, the pressure drop along the steam path can be well defined thus giving each stage a nominal pressure at the first operational mode. The multistage steam turbine may include a high pressure stage and the high pressure turbine inlet may be provided at an inlet region of the high pressure stage. Steam generated by the solar receiver steam generator during the first operating mode may thus be initially expanded in the high pressure turbine stage during the first operating mode.

The multistage steam turbine may include one or more lower pressure stages downstream of the high pressure stage and can include an intermediate pressure stage and a low pressure stage.

In an exemplary embodiment, the solar thermal power system may be arranged to inject the lower pressure and lower temperature steam generated during the second operating mode into one of the lower pressure stages to drive the steam turbine. In an exemplary preferred implementation, the solar thermal power system may be arranged to inject the lower pressure and lower temperature steam generated during the second operating mode into the intermediate pressure stage to drive the steam turbine. In this exemplary implementation, it is the intermediate pressure stage that is compatible with the lower pressure and lower temperature of the steam generated during the second operating mode. The lower pressure and lower temperature steam is, thus, initially expanded in the intermediate pressure stage and thereafter expanded in the low pressure stage during the second operating mode. Very little or no steam is expanded in the bypassed high pressure stage during the second operating mode and the high pressure stage does not, thus, contribute to the power output of the turbine.

In another embodiment, the high pressure stage may include a first section and a second section downstream of the first section. The solar thermal power system may be arranged to inject the lower pressure and lower temperature steam generated during the second operating mode into the second section of the high pressure stage. In this embodiment, it is the second section of the high pressure stage that is compatible with the lower pressure and lower temperature of the steam generated during the second operating mode. The lower pressure and lower temperature steam is, thus, initially expanded in the second section of the high pressure stage and thereafter may be expanded in the lower pressure stage(s) during the second operating mode. Steam is not expanded in the bypassed first section of the high pressure stage during the second operating mode and the first section does not, thus, contribute to the power output of the turbine.

The solar thermal power system may be arranged to supply a small proportion of the lower pressure and lower temperature steam generated by the thermal energy storage arrangement during the second operating mode to the high pressure turbine inlet to act as a cooling flow for the high pressure region of the steam turbine. The cooling flow thus prevents the high pressure region, for example the high pressure stage or the first section of the high pressure stage, of the steam turbine from running empty. The solar thermal power system may include a heater, for example an electrical superheater, to heat the cooling flow prior to injection into the high pressure turbine inlet. This can, for example, prevent excessive cool-down of the high pressure region, for example the high pressure stage or the first section of the high pressure stage.

The solar thermal power system may include a condenser which may be connected to the high pressure region of the steam turbine, for example the high pressure stage or the first section of the high pressure stage, during the second operating mode. The condenser maintains the high pressure region at a low pressure and can thus avoid excessive temperatures in the high pressure region when a cooling flow as described herein is not provided to the high pressure region.

The solar thermal power system may include a clutch device to decouple the high pressure region of the steam turbine during the second operating mode. With this arrangement, the high pressure region of the steam turbine does not rotate during the second operating mode and it may not, therefore, be necessary or desired to provide a cooling flow to the high pressure region or connect the high pressure region to a condenser in the manner described herein. The clutch device may be arranged between the high pressure region of the steam turbine, for example the high pressure stage or the first section of the high pressure stage, and the electrical generator. The clutch device may be arranged between the high pressure stage and the intermediate pressure stage to decouple the high pressure stage from the intermediate pressure stage during the second operating mode. The clutch device may be arranged between the first and second sections of the high pressure stage to decouple the first section from the second section during the second operating mode.

An exemplary embodiment of the operating method according to the second aspect may comprise injecting the lower pressure and lower temperature steam generated during the second operating mode into one of the lower pressure stages to drive the steam turbine. In an exemplary embodiment, the operating method may comprise injecting the lower pressure and lower temperature steam generated during the second operating mode into the intermediate pressure stage to drive the steam turbine. As described above, the lower pressure and lower temperature steam is initially expanded in the intermediate pressure stage and thereafter in the low pressure stage in this exemplary embodiment.

In embodiments in which the high pressure turbine stage comprises first and second sections, the operating method may comprise injecting the lower pressure and lower temperature steam generated during the second operating mode into the second section of the high pressure stage.

The operating method may comprise supplying a proportion of the lower pressure and lower temperature steam to the high pressure turbine inlet during the second operating mode. As already stated, this can act as a cooling flow for the high pressure region of the steam turbine. The operating method may comprise heating the cooling flow of steam prior to injection into the high pressure turbine inlet, for example by passing the cooling flow of steam through an electrical superheater or other suitable heater.

The operating method may comprise maintaining the high pressure region of the steam turbine at a low pressure during the second operating mode, for example by connecting the high pressure region to a condenser as outlined herein.

The operating method may comprise decoupling the high pressure region of the steam turbine during the second operating mode. This can prevent rotation of the high pressure region of the steam turbine during the operating mode, and can provide advantages already described.

The thermal energy storage fluid can, for example, be a liquid. The thermal energy storage liquid may be a molten salt, which may for example be capable of being heated to a maximum operating temperature in the region of 580° C. (or other appropriate temperature) during the first operating mode for the effective storage of thermal energy. The molten salt may be a nitrate salt or a carbonate salt, although other forms of molten salt, such as mixtures of salts and so forth, are entirely within the scope of the present disclosure.

The thermal energy storage arrangement may include two fluid storage locations for the thermal energy storage fluid, one of which may be a high temperature fluid storage tank and the other of which may be a relatively lower temperature fluid storage tank. The thermal energy storage system may alternatively include both fluid storage locations in a single thermocline fluid storage tank, for example with high temperature fluid at the top and low temperature fluid at the bottom, although these single tank storage solutions are still under development. The thermal energy storage arrangement may include a heat exchanger which may be positioned between the high temperature and low temperature fluid storage locations, enabling thermal energy to be transferred from the superheated steam to the thermal energy storage fluid as it circulates from the low temperature fluid storage location to the high temperature fluid storage location during a charging cycle. The thermal energy storage system may include a further heat exchanger which may be operable to recover thermal energy from the thermal energy storage fluid as it circulates from the high temperature fluid storage location to the low temperature fluid storage location during a discharging cycle. The thermal energy recovered by the further heat exchanger is used to generate steam for expansion in the multistage steam turbine during the second operating mode.

A three-tank solution can also be provided for alternate embodiments using the principles disclosed herein.

Figure 2:
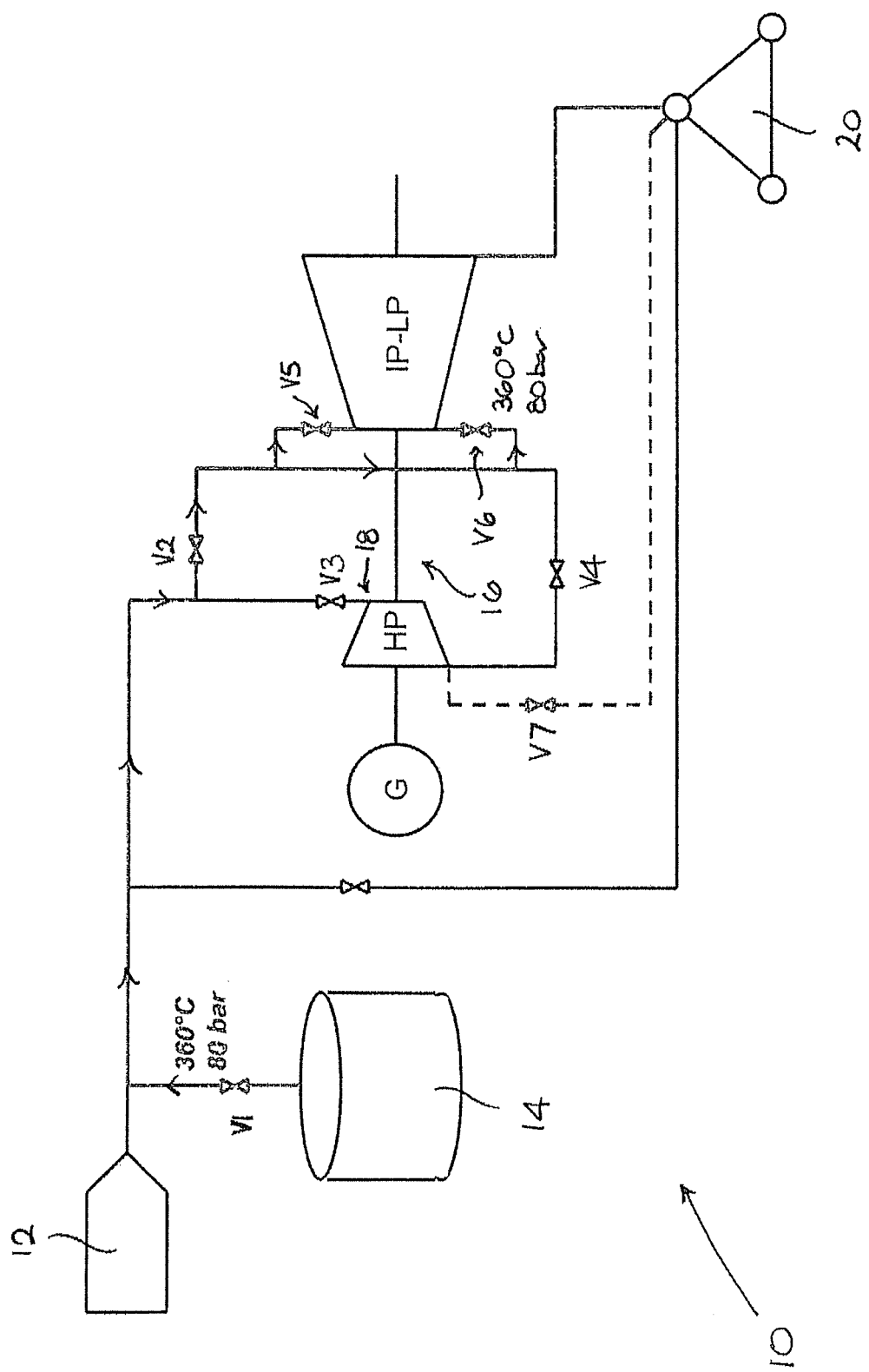

Referring initially to FIGS. 1 and 2, there is shown diagrammatically a solar thermal power system 10 including a solar receiver steam generator 12. The solar receiver steam generator 12 can include a solar radiation receiver mounted on top of a tower, solar radiation being reflected onto the solar radiation receiver by a heliostat field surrounding the tower. The heliostat field can be replaced by any other solar heating system such as Fresnel collectors.

The solar thermal power system includes a thermal energy storage arrangement 14 which utilises, for example, molten salt as a sensible heat thermal energy storage fluid. In exemplary embodiments the thermal energy storage arrangement 14 can include an insulated hot salt storage tank and a relatively cool salt storage tank, a first heat exchanger to transfer heat to the cool molten salt as it flows from the cool salt storage tank to the holt salt storage tank during a charging cycle, and a second heat exchanger to recover heat from the hot molten salt as it flows from the hot salt storage tank to the cool salt storage tank during a discharging cycle.

The solar thermal power system 10 includes a multistage steam turbine 16 comprising a high pressure stage HP and intermediate and low pressure stages IP, LP downstream of the high pressure stage HP. The steam turbine 16 includes a high pressure turbine inlet 18 at the inlet region of the high pressure stage HP through which steam can be supplied to the high pressure stage HP for expansion through the steam turbine 16. Superheated steam expanded through the steam turbine 16 drives an electrical generator G to generate electrical power in any known manner. An air-cooled condenser 20 is also provided.

The solar thermal power system 10 is operated in different modes depending on, for example, the prevailing power generation specifications and the amount of solar radiation that is available.

During daylight hours, the solar thermal power system 10 can be operated in a first operating mode (combined power generation/storage mode), as shown in FIG. 1, provided that there is a sufficient amount of solar radiation. In the first operating mode, water circulating in the solar receiver steam generator 12 is heated by thermal energy arising from solar radiation reflected by the heliostat field onto the solar radiation receiver. This generates superheated steam, for example, at a pressure in the region of 120 to 175 bar (or lesser or greater) and a temperature in the region of 560° C. to 590° C. (or lesser or greater). In the illustrated embodiment, the generated superheated steam has an exemplary pressure of about (e.g., ±10%) 170 bar and a temperature of about 585° C.

In the first operating mode, a proportion of the mass flow rate of superheated steam generated by the solar receiver steam generator 12 is supplied directly to the high pressure turbine inlet 18 for expansion through the high, intermediate and low pressure stages HP, IP, LP of the steam turbine 16 in known manner. As indicated above, expansion of the superheated steam in the steam turbine 16 drives the electrical generator G, thereby generating electrical power.

A proportion of the mass flow rate of superheated steam generated by the solar receiver steam generator 12 is supplied to the thermal energy storage arrangement 14 and fed through the first heat exchanger during the charging cycle. The superheated steam is cooled in the first heat exchanger and heat is transferred from the superheated steam to the molten salt as it circulates from the cool salt storage tank to the hot salt storage tank.

In the embodiment of the first operating mode illustrated in FIG. 1, about 50% of the mass flow rate of steam generated by the solar receiver steam generator 12 is supplied to the high pressure turbine inlet 18 to support electrical power generation whilst the remaining 50% of the mass flow rate of steam is supplied to the thermal energy storage arrangement 14 to heat the molten salt. These proportions can, of course, be varied as desired by controlling the system valves.

In the first operating mode illustrated in FIG. 1, the thermal power system can include flow control, represented for example, as including the valves designated V1, V3, V4, V5 and V6 (or any suitable flow control devises including software and hardware) which are open whilst the designated V2 is closed, so that the superheated steam generated by the solar receiver steam generator 12 flows along the path shown by the arrows.

At times when there is insufficient solar energy to directly heat the water circulating in the solar receiver steam generator 12 to provide steam at the desired pressure and temperature for efficient operation of the solar thermal power system 10 in the first operating mode already described, the solar thermal power system 10 can be operated in a second operating mode (energy recovery mode), as shown in FIG. 2, to supply superheated steam to the steam turbine 16. In the second operating mode, the second heat exchanger is used to recover thermal energy from hot molten salt during the discharging cycle as the hot molten salt flows from the hot salt storage tank to the cool salt storage tank. This operating mode can, for example, be used during non-daylight hours when solar radiation is not available to generate steam in the solar receiver steam generator 12. It can also be used during daylight hours if there is insufficient solar radiation to generate steam in the solar receiver steam generator 12 at the desired pressure and temperature for the steam turbine 16, for example during overcast conditions.

Due to the energy losses discussed in the Technical Background section of this specification, the superheated steam generated during the second operating mode by recovering thermal energy from the hot molten salt during the discharging cycle has a lower pressure and temperature than the superheated steam generated by the solar receiver steam generator 12 during the first operating mode. In the illustrated embodiment, the steam generated by the thermal energy storage arrangement 14 during the second operating mode of the solar thermal power system 10 has a pressure of about 80 bar and a temperature of about 360° C. The steam mass flow rate at the downstream injection location is, for example, about 45% higher than during direct production.

In accordance with aspects of the present disclosure, the lower pressure and lower temperature steam generated during the second operating mode is injected into the intermediate stage 1P of the steam turbine 16, rather than into the high pressure stage HP via the high pressure turbine inlet 18, the intermediate stage being compatible with the lower pressure and lower temperature steam conditions during the second operating mode. The high pressure turbine inlet 18, and hence the high pressure stage HP of the steam turbine 16, can therefore be bypassed during the second operating mode. In an exemplary embodiment, steam is not expanded in the high pressure stage HP during the second operating mode and the high pressure stage HP does not contribute to the generation of electrical power.

As explained herein, bypassing the high pressure stage HP provides steam at a higher pressure (e.g., about 80 bar) to the intermediate pressure stage 1P than the steam flowing through the intermediate pressure stage 1P during the first operating mode (when the pressure is about 50 bar). There is, therefore, a greater mass flow rate of steam (e.g., about 45% higher) through the intermediate pressure stage 1P during the second operating mode than during the first operating mode when the steam from the solar receiver steam generator 12 is initially expanded in the high pressure stage HP. As a result of the increased steam mass flow rate, the power output of the intermediate pressure stage 1P and also the low pressure stage LP is increased during the second operating mode, thereby providing a greater power output than would otherwise be achieved if the lower pressure and lower temperature steam was injected into the high pressure turbine inlet 18 and expanded through the high, intermediate and low pressure stages HP, IP, LP.

In the second operating mode illustrated in FIG. 2, the valves designated V1, V2, V5 and V6 are open whilst the valves designated V3 and V4 are closed so that the superheated steam generated by the thermal energy storage system 14 flows along the path shown by the arrows and bypasses the high pressure stage HP of the steam turbine 16. Furthermore, the valve designated V7 is, for example, open so that the high pressure stage HP is connected to the condenser 20. This maintains the high pressure stage HP at a relatively low pressure during the second operating mode and thereby avoids excessive temperatures in the high pressure stage HP which is running empty.

Figure 3:
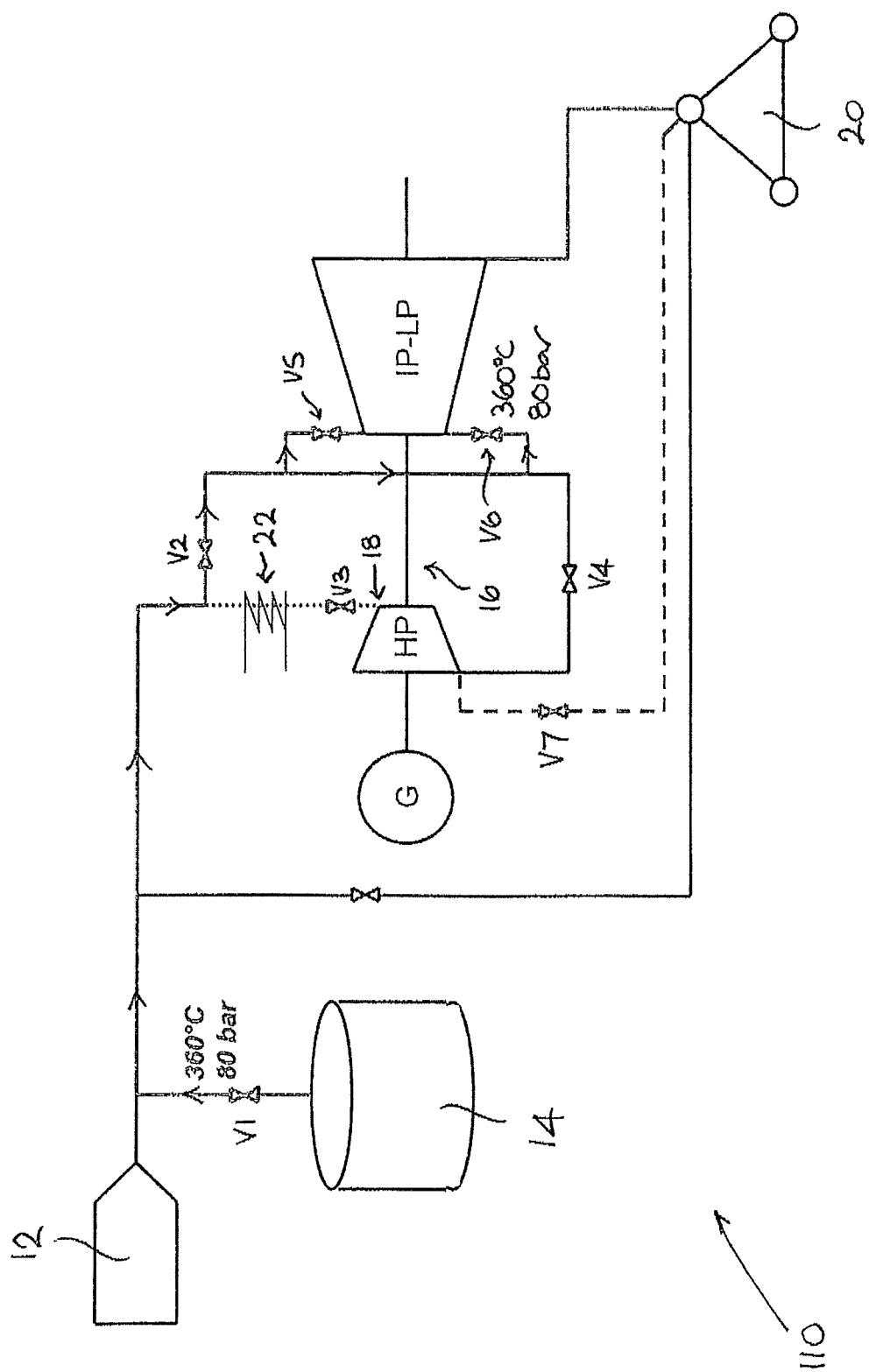
FIG. 3 is a diagrammatic illustration of an exemplary embodiment of a solar thermal power system.

Referring now to FIG. 3, there is shown another exemplary embodiment of a solar thermal power system 110 which is similar to the solar thermal power system 10 illustrated in FIGS. 1 and 2 and in which corresponding components are identified using the same references.

The solar thermal power system 110 of FIG. 3 operates in the same manner as the solar thermal power system 10 of FIGS. 1 and 2 during the first operating mode. During the second operating mode, the valve V3 is, however, partially open to allow a small cooling flow of steam generated by recovering thermal energy from the molten salt to be supplied to the high pressure stage HP of the steam turbine 16 through the high pressure turbine inlet 18. The solar thermal power system 110 includes an electrical superheater 22 which heats the cooling flow during the second operating mode to prevent excessive cooling of the high pressure stage HP. The cooling flow supplied to the high pressure stage HP does not contribute to the power output of the steam turbine 16. The valve V7 is open during the second operating mode so that condensed steam from the high pressure stage HP can be fed to the condenser 22.

Figure 4:
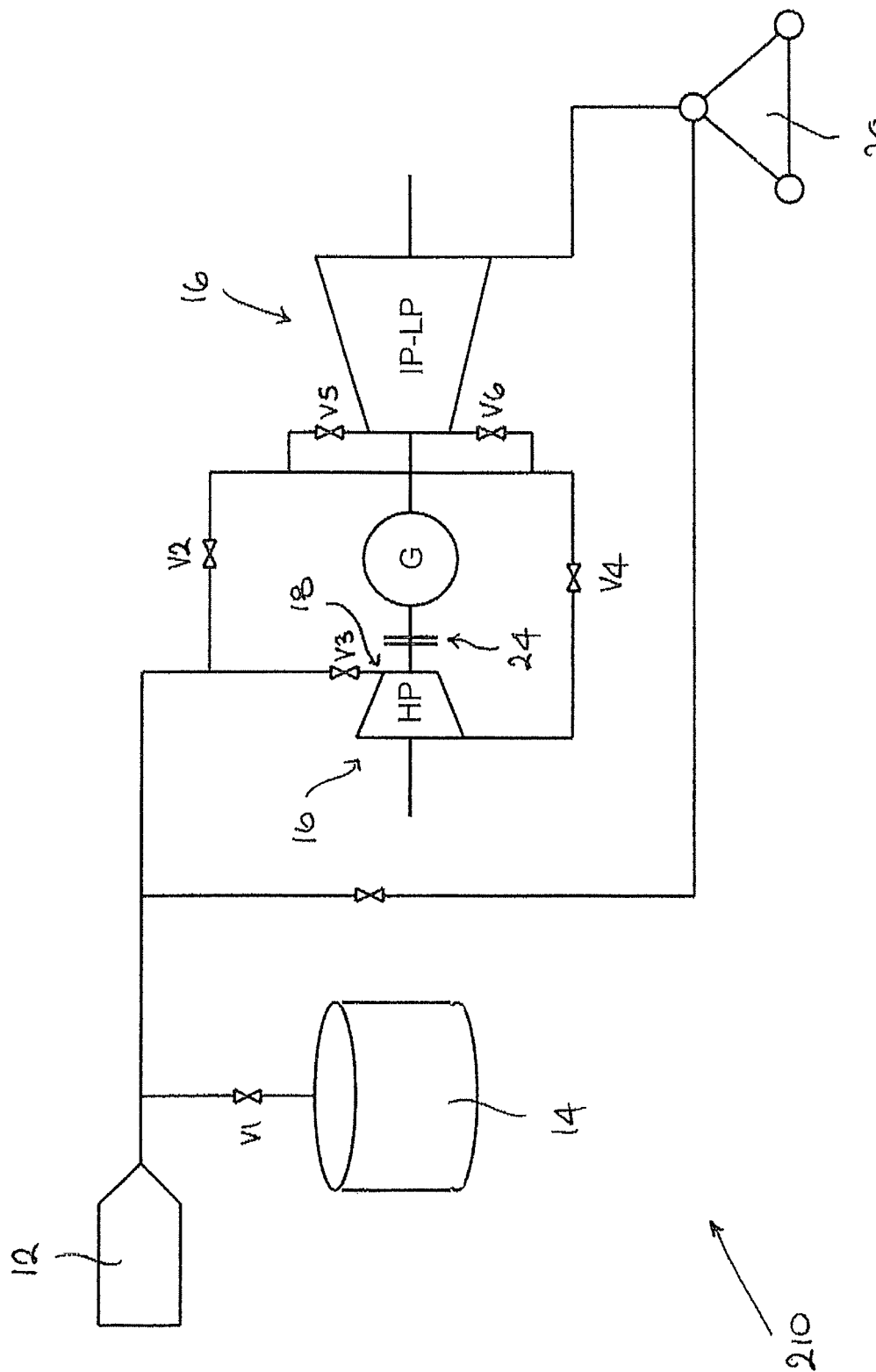
FIG. 4 is a diagrammatic illustration of an exemplary embodiment of a solar thermal power system.

Referring now to FIG. 4, there is shown another exemplary embodiment of a solar thermal power system 210 which is similar to the solar thermal power system 10 illustrated in FIGS. 1 and 2 and in which corresponding components are identified using the same references.

The solar thermal power system 210 includes a clutch device 24 which can be can be used during the second operating mode to decouple the high pressure stage HP of the steam turbine 16 from the electrical generator G and the intermediate and low pressure stages 1P, LP. Accordingly, the high pressure stage HP does not rotate during the second operating mode and it is thus not necessary to connect the high pressure stage HP to the condenser 20 to maintain it at a low pressure as described with reference to FIG. 2 or to provide a cooling flow to the high pressure stage 20 as described above with reference to FIG. 3.

In principle an increased mass flow can also be achieved by means of having a parallel turbine in place.

Although exemplary embodiments have been described in the preceding paragraphs, it should be understood that various modifications may be made to those embodiments without departing from the scope of the appended claims.

For example, the steam pressures and temperatures at different points in the solar thermal power system are provided for illustrative purposes only. It should be understood that other steam pressures and temperatures are entirely within the scope of the appended claims.

Although the thermal energy storage fluid can be a molten salt, other thermal energy storage fluids having a high specific heat capacity could be employed. As well other thermal energy storage systems based on other storage media (e.g. solid media like concrete) could be employed.

Unless the context clearly requires otherwise, throughout the description and the claims, the words "comprise", "comprising", and the like, are to be construed in an inclusive as opposed to an exclusive or exhaustive sense; that is to say, in the sense of "including, but not limited to".

Thus, the breadth and scope of the claims should not be limited to the above-described exemplary embodiments.

Each feature disclosed in the specification, including the claims and drawings, may be replaced by alternative features serving the same, equivalent or similar purposes, unless expressly stated otherwise.

It will therefore be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. A solar thermal power system, comprising:
    a solar receiver steam generator to generate steam using thermal energy generated by a solar heat source;
    a thermal energy storage arrangement having a thermal energy storage fluid to store thermal energy, the thermal energy storage arrangement having a discharge operating mode wherein the stored thermal energy is used to generate steam with a heat exchanger;
    a multistage steam turbine having a high pressure region with a high pressure turbine inlet; and
    a flow control system comprising controllable flow control devices, the flow control system having first and second operating modes, wherein:
    in the first operating mode, steam generated by the solar receiver steam generator is supplied to the thermal energy storage arrangement to heat the thermal energy storage fluid, and is also supplied to the high pressure turbine inlet of the multistage steam turbine to drive the steam turbine; and
    in the second operating mode, steam generated by the heat exchanger using the stored thermal energy from the thermal energy storage fluid is not provided to the high pressure turbine inlet for purposes of driving turbine stages in the high pressure region but is injected into the multistage steam turbine to drive the steam turbine at a turbine stage downstream of the high pressure turbine inlet, wherein pressure of the steam generated using the stored thermal energy exceeds pressure present in the turbine stage downstream of the high pressure turbine inlet during the first operational mode, and thereby increase mass flow through the turbine relative to mass flow during the first operational mode.

2. The solar thermal power system according to claim 1, comprising:
    an inlet region of a high pressure stage of the multistage steam turbine, provided at the high pressure turbine inlet.

3. The solar thermal power system according to claim 2, wherein the multistage steam turbine comprises:
    one or more lower pressure stages downstream of the high pressure stage, wherein the steam at storage discharge pressure and storage discharge temperature generated during the second operating mode will be injected into a turbine stage having a lower pressure during the first operational mode to drive the steam turbine.

4. The solar thermal power system according to claim 3, wherein the multistage steam turbine comprises:
    an intermediate pressure stage and a low pressure stage and the steam at storage discharge pressure and storage discharge temperature generated during the second operating mode will be injected into the intermediate pressure stage to drive the steam turbine.

5. The solar power system according to claim 4, wherein the solar thermal power system comprises:
    a condenser connected to the high pressure region of the steam turbine during the second operating mode to maintain the high pressure region at a low pressure.

6. The solar power system according to claim 4, wherein the solar thermal power system comprises:
    a clutch device to decouple the high pressure region of the steam turbine or preventing its rotation during the second operating mode.

7. The solar thermal power system according to claim 1, configured to supply a proportion of the steam at storage discharge pressure and storage discharge temperature generated during the second operating mode to the high pressure turbine inlet as a cooling flow.

8. The solar thermal power system according to claim 7, comprising:
    an electrical superheater to heat the cooling flow prior to injection into the high pressure turbine inlet.

9. The solar thermal power system according to claim 1, wherein the solar thermal power system comprises:
    a condenser connected to the high pressure region of the steam turbine during the second operating mode to maintain the high pressure region at a low pressure.

10. The solar thermal power system according to claim 1, wherein the solar thermal power system comprises:
    a clutch device to decouple the high pressure region of the steam turbine for preventing its rotation during the second operating mode.

11. A method for operating a solar thermal power system having a solar receiver steam generator, a thermal energy storage arrangement with a thermal energy storage fluid, a multistage steam turbine having a high pressure region with a high pressure turbine inlet, the method comprising:
    generating steam during a first operating mode by the solar receiver steam generator with energy generated by a solar heat source;
    generating steam during a second operating mode with a heat exchanger using stored thermal energy from the thermal energy storage fluid;
    supplying the steam generated during the first operating mode to the thermal energy storage arrangement to heat the thermal energy storage fluid, and also supplying the steam generated during the first operating mode to the high pressure turbine inlet of the multistage steam turbine to drive the steam turbine; and
    for driving the multistage steam turbine during the second operating mode, injecting the steam generated by the heat exchanger during the second operating mode into the multistage steam turbine at a turbine stage downstream of the high pressure turbine inlet while preventing use of the steam in the high pressure turbine region for turbine driving, wherein the pressure of the steam generated in the second operating mode exceeds the pressure present in the turbine stage downstream of the high pressure turbine inlet in the first operational mode, and thereby increasing mass flow through the turbine relative to mass flow during the first operational mode.

12. The method according to claim 11, wherein the multistage steam turbine includes one or more lower pressure stages downstream of the high pressure stage and the operating method comprises:
    injecting the steam at storage discharge pressure and storage discharge temperature generated during the second operating mode into a lower pressure stage to drive the steam turbine.

13. The method according to claim 12, wherein the multistage steam turbine includes an intermediate pressure stage and a low pressure stage, and the operating method comprises:
  injecting the steam generated during the second operating mode into the intermediate pressure stage to drive the steam turbine.

14. The method according to claim 13, comprising:
(a) supplying a proportion of the steam to the high pressure turbine inlet during the second operating mode to act as a cooling flow for the high pressure region of the steam turbine, and heating the cooling flow of steam prior to injection into the high pressure turbine inlet; or
(b) maintaining the high pressure region of the steam turbine at a low pressure during the second operating mode; or
(c) decoupling the high pressure region of the steam turbine during the second operating mode to prevent its rotation.

15. The method according to claim 11, comprising:
(a) supplying a proportion of the steam to the high pressure turbine inlet during the second operating mode to act as a cooling flow for the high pressure region of the steam turbine, and heating the cooling flow of steam prior to injection into the high pressure turbine inlet; or
(b) maintaining the high pressure region of the steam turbine at a low pressure during the second operating mode; or
(c) decoupling the high pressure region of the steam turbine during the second operating mode to prevent its rotation.

* * * * *